United States Patent
Runggaldier et al.

Patent Number: 5,159,657
Date of Patent: Oct. 27, 1992

[54] METHOD AND APPARATUS FOR CONTROLLING SINGLE OR POLYPHASE A.C. POWER CONTROLLERS

[75] Inventors: Diethard Runggaldier, Stegaurach; B. Claus Doerwald, Hoechstadt, both of Fed. Rep. of Germany

[73] Assignee: Siemens Aktiengesellschaft, Berlin & Munich, Fed. Rep. of Germany

[21] Appl. No.: 465,322

[22] Filed: Jan. 16, 1990

[30] Foreign Application Priority Data

Jan. 23, 1989 [EP] European Pat. Off. ........ 89101151.2

[51] Int. Cl.$^5$ .......................... H02P 5/16; H02P 5/40
[52] U.S. Cl. .................................. 388/811; 323/241; 318/812
[58] Field of Search ............... 318/729, 809, 812, 810; 388/804, 805, 811, 812, 829; 323/241, 265, 266, 274

[56] References Cited

U.S. PATENT DOCUMENTS

| | | | |
|---|---|---|---|
| 4,426,614 | 1/1984 | Nola | 323/243 |
| 4,439,718 | 3/1984 | Nola | 318/729 |
| 4,459,529 | 7/1984 | Johnson | 318/729 |
| 4,468,603 | 8/1984 | Vander Meer et al. | 318/779 |
| 4,486,824 | 12/1984 | Okuyama et al. | 363/41 |
| 4,710,692 | 12/1987 | Libert et al. | |
| 5,008,608 | 4/1991 | Unsworth et al. | 318/729 |

FOREIGN PATENT DOCUMENTS

| | | |
|---|---|---|
| 0055856 | 7/1982 | European Pat. Off. . |
| 0554613 | 8/1974 | Switzerland . |
| 2084359 | 4/1982 | United Kingdom . |
| 2085359 | 4/1982 | United Kingdom . |

*Primary Examiner*—David Smith, Jr.
*Attorney, Agent, or Firm*—Kenyon & Kenyon

[57] ABSTRACT

A method and apparatus for controlling single or polyphase a.c. power controllers when controlling a.c. power controllers by means of phase angle control of semiconductor switches, the firing signals on the one hand must be long enough to guarantee a reliable firing and, on the other hand, be short enough to prevent an overloading of ignition amplifiers. According to the invention, therefore the use of firing signals with variable temporal lengths is provided, which end at least approximately at the reestablishment of the current flowing in the phase that has been fired. Moreover, devices for implementing the method are specified.

7 Claims, 3 Drawing Sheets

METHOD AND APPARATUS FOR CONTROLLING SINGLE OR POLYPHASE A.C. POWER CONTROLLERS

BACKGROUND OF THE INVENTION

The present invention refers to methods and a device for controlling single or polyphase a.c. power controllers by means of phase angle control of semiconductor switches.

For regulation of the power supplied to an electrical load in an a.c. system, a.c. power controllers are used which are controlled by means of phase angle control of semiconductor switches. Particularly during operation of a single phase a.c. motor, the changing operating conditions of the motor—such as, e.g. starting, stopping and operation at varying loads -require a regulation of the power supplied to the motor in order to protect the system, the motor and the driving mechanism from unnecessary strain.

A device for controlling an a.c. power controller for a single phase a.c. motor is known from British Pat. No. 2,084,359, in which, e.g., an unfavorable power factor that arose through an underloading of the motor is to be improved. For this purpose, controllable semiconductor switches, especially a Triac [bidirectional triode thyristor] or an antiparallel thyristor circuit, are assigned to the motor for each supply phase. By controlling the phase angle, these semiconductor switches make possible a power input that is dependent on the actual operating conditions of the motor. An improvement of the power factor is achieved in this known device in that the phase difference between current and voltage is detected for each phase in a control device and is reduced by a corresponding increase of the firing angle, i.e. the period that elapses between the zero crossing of the current wave and the firing point for the respective phase. In the known device, the time point of the current zero is used as a time reference for the determination of the firing point, which time point is detected by measuring the voltage applied across the Triac. This voltage is supplied to a comparator, whose output states correspond to the conduction states of this Triac. The current zero, then, corresponds to an edge of the output signal of the comparator, from which edge a strobe pulse is generated with the aid of a monoflop for a ramp voltage that is synchronized with the zero crossing of the power supply voltage. The sampled value of the ramp voltage is subtracted from a reference voltage that is externally inputted over a potentiometer and is transmitted to the inverting input of a differential amplifier, whose output voltage, together with the ramp voltage, is supplied to an additional comparator. This comparator generates a primary firing signal by means of a downstream triggering pulse generator whenever the ramp voltage exceeds the output voltage of the differential amplifier. By means of this circuit arrangement, the phase shift between motor current and motor voltage and thus the power factor are thereby stabilized at a value which is given by the reference voltage adjusted at the potentiometer.

In the case of three-phase a.c. motors, which are operated without neutral wires, e.g. in open star- or delta connections, one must be careful during phase angle control that at least two phases are simultaneously conductive at all times. In the case of firing angles that exceed 60°, this is the case only when a second phase is fired in addition to the phase initiating the firing. This second phase is defined by the rotational direction of the a.c. voltage and the phase initiating the firing.

In the known device, this is realized by a logic circuit consisting of six AND-gates, of which two respectively, are assigned to the control device of a respective phase. By means of a rotational direction detector, a binary signal is applied according to rotational direction of the a.c. voltage on one of two output lines of the rotational direction detector. Together, respectively, with the output line for the primary firing signal of the phase being released, these output lines are placed at various AND-gates, whose outputs supply, respectively, the gate of one of the two other Triacs with secondary firing signals. The temporal length of the firing signals applied to the gates of the Triacs or thyristors must be adequate in order to guarantee a reliable firing of the respective circuit. This is accomplished in that starting with empirical values, a fixed temporal length is selected that is long enough to bring about a firing under all operating conditions. However, in order to prevent an overload of required ignition amplifiers—especially ignition transformers—too long a duration of the firing signal is undesirable. In practice, this leads to compromises which are not always satisfactory in determining the temporal lengths of the firing signals.

SUMMARY OF THE INVENTION

It is an object of the present invention to provide a method of controlling single or polyphase a.c. power controllers in which the firing signals used for firing the semiconductor switches are, on the one hand, long enough to guarantee a reliable firing and, one the other hand, can be dimensioned short enough to prevent the overloading of the ignition amplifiers.

It is furthermore an object of the invention to provide a device which is suitable for implementation of this method.

The above and other objects of the present invention are achieved by a method for controlling a single or polyphase a.c. power controller having semiconductor switches comprising the steps of specifying a time length of primary firing signals for each phase, time delaying the primary firing signals, deriving secondary firing signals from the time-delayed primary firing signals, generating variable time lengths for the secondary firing signals for phase angle control, and terminating the secondary firing signals at least approximately at a reestablishment of current flowing in the respective phase that has been fired.

It is ensured that with adequate length of the firing pulse, a firing does not take place over and above the necessary time scale, since secondary firing signals with variable temporal lengths are provided for the phase angle control. These secondary firing signals are derived from time-delayed primary firing signals that have a firmlyspecified temporal length and these secondary firing signals, end at least roughly at the reestablishment of the current flowing in the phase that has been fired.

A device for implementation of the method includes devices which indicate the reestablishment of the fired current and pass on a corresponding electrical signal to a device which uses this electrical signal for generating corresponding, timelimited firing signals.

BRIEF DESCRIPTION OF THE DRAWINGS

For further explanation of the invention, reference is made to the drawing, in which.

DETAILED DESCRIPTION

Figure 1:
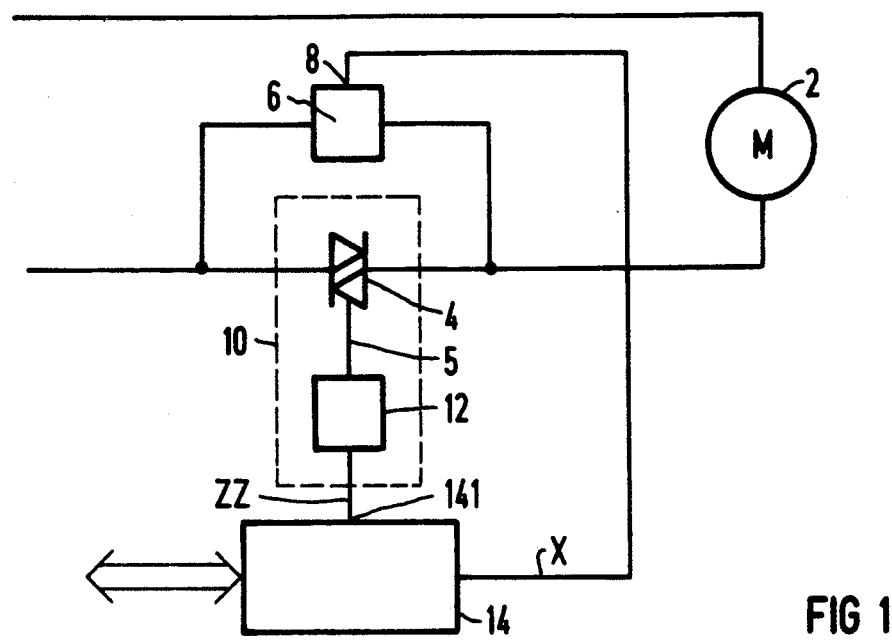
FIG. 1 shows a block diagram of a device for implementation of the method according to the invention.

Corresponding to FIG. 1, a load—e.g., a motor 2 is connected to the phase of a single-phase a.c. system via a semiconductor switch 4 e.g., a Triac or a circuit arrangement consisting of several semiconductor switches, e.g. a thyristor circuit. The semiconductor switch 4 is provided with a control electrode 5 and part of a firing device 10, which includes the ignition amplifiers 12—e.g. optotriacs or ignition transformers—required for the semiconductor switch 4. In place of an electrically-fired semiconducter switch 4, an optically-fired semiconductor switch can also be provided.

The controlling of the semiconductor switch takes place by phase angle control, i.e. time delay firing. A firing signal that produces a firing of the semiconductor switch 4 is applied to the control electrode 5 for this purpose as a function of the phase position.

The reference detector 6 is assigned to the semiconductor switch 4 with which reference detector 6 the current zero of the current I flowing in the circuit is detected by way of the voltage drop across the semiconductor switch 4 in the preferred specific embodiment according to the figure. The current zero serves to determine a time reference for controlling the phase angle. A corresponding reference signal X is issued at output 8 of the reference detector 6. The reference detector 6 includes for this purpose, e.g., a comparator which compares the absolute value of the voltage drop across the semiconductor switch 4 with a defined threshold value. A reference signal X having two voltage levels thus is present on output 8. A condition is thereby indicated with one voltage level, which condition corresponds to a current flowing in the phase that is less than a value associated with the threshold value. With the correspondingly low selection of this threshold value, e.g. approximately 10 V, this voltage level then essentially corresponds to the current zero, and the reference signal X essentially reproduces the conduction states of the semiconductor switch 4. The edges between these two conduction states coincide chronologically at least, then, approximately with the current zero of the current I flowing through the semiconductor switch 4.

The output 8 of the reference detector 6 is connected to a control device 14, e.g. a microprocessor, which derives a time-delayed firing signal ZZ from the reference signal X according to a preselected firing angle and makes it available on a control output 141. The firing angle is determined by the control device 14 within the scope of a, e.g., control program that is externally selectable as well as based on externally inputtable motor parameters. The firing angle can also be time-dependent by means of a program running internally in the control device 14. Thus, for instance, a "soft start" of the motor 2 is made possible by a time-dependent firing angle that is reduced starting from a predefined value down to a minimum value.

Figure 2:
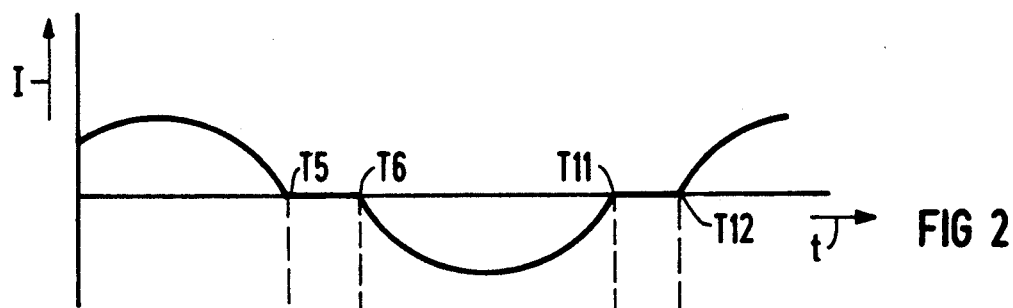
FIGS. 2 to 4 show the respective electrical signals used for the firing process plotted against time diagrammatically.
Figure 3:
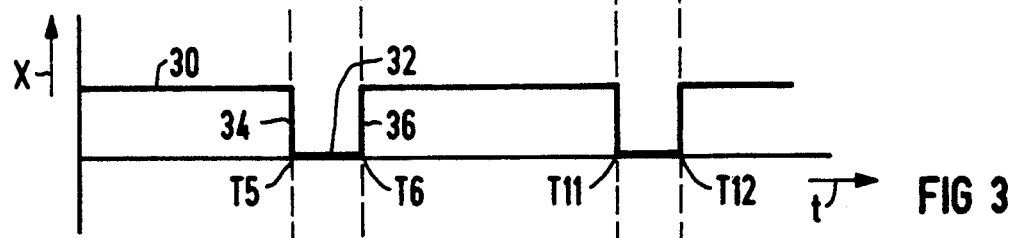

In FIG. 2, the current flowing in the circuit is plotted against time. When the current zero is reached at the instants T5 and T11, the semiconductor switch assigned to this circuit extinguishes until the reignition at the instants T6 and T12. The reference detector generates a reference signal X, which, according to FIG. 3, has two signal levels 30 and 32 which essentially correspond to the conduction state of the switch. The signal levels 30 and 32 are separated from each other by the first and second edges 34 and 36 respectively. In this manner, the instant T5 or T11, respectively, of reaching the current zero is defined by the first trailing edge 34 in the example according to the figure, and the instant T6 or T12, respectively, of reignition is defined by the second leading edge 36 in the example according to the figure.

Figure 4:
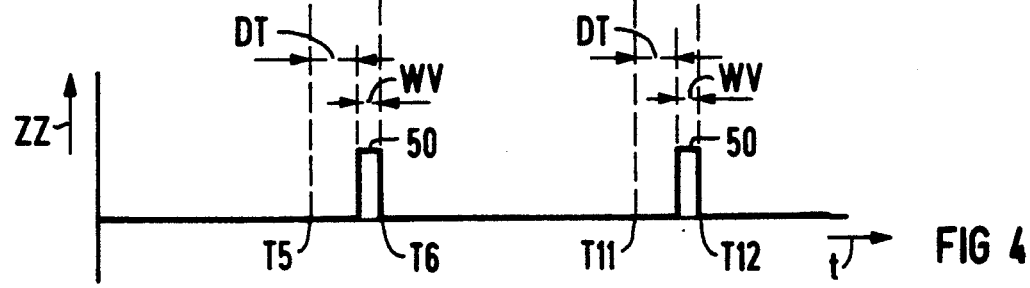

In the control unit, a counter, whose readings are selected by the control device, is responsive to the trailing edge 34 of the reference signal X. After a preselected counter reading is reached, the control device then produces firing signals ZZ according to corresponding time displacement DT at the instant T5+DT and T11+DT, which firing signals ZZ are indicated in FIG. 4 by the reference numeral 50. These firing signals ZZ end at the instants T6 or T12, respectively, which roughly coincide temporally with the reestablishment of the current. The firing signals ZZ thus have a variable temporal length WV and last only as long as the current in the phase actually being fired. The temporal lengths of these firing signals ZZ must be long enough to guarantee that the holding current of the semiconductor switch is exceeded. This effectively occurs in that the threshold value for the reference detector is set adequately high, e.g. at approximately 10 V, so that the edge 36 will be triggered only then, when the current exceeds the required holding current. The instants T5, T6, T11 and T12, therefore, in deviation from the simplified representation according to FIG. 2, are to be understood as instants at which the current falls below or exceed a defined threshold value in the proximity of current zero.

Figure 5:
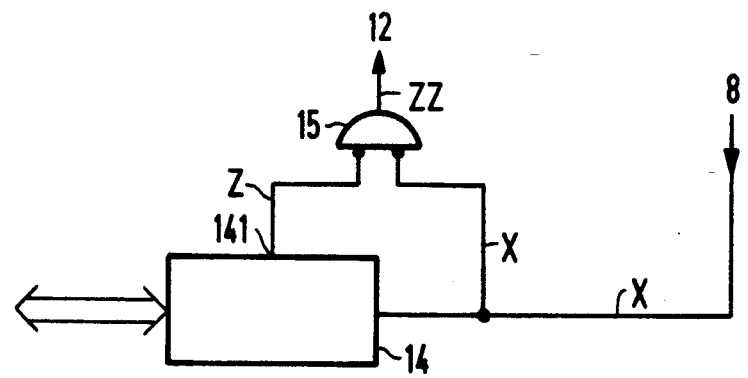
FIG. 5 shows a block diagram of an additional device for implementation of an advantageous development of the method according to the invention.
Figure 6:
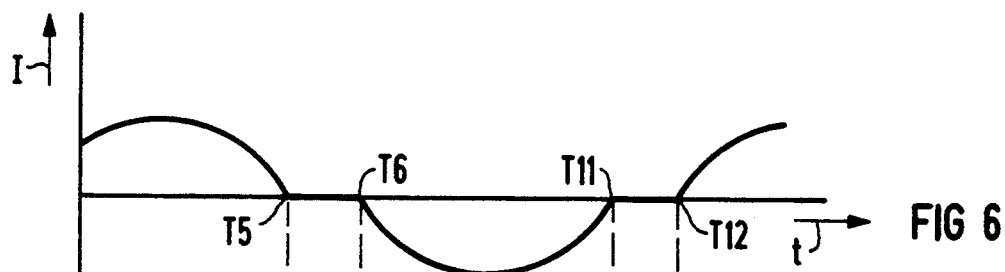
FIGS. 6 to 9 show the timing diagrams of the electrical signals associated with the specific embodiment of FIG. 5 in greater detail.
Figure 7:
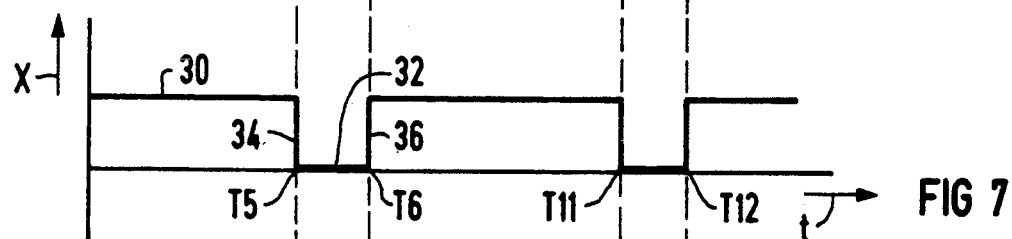
Figure 8:
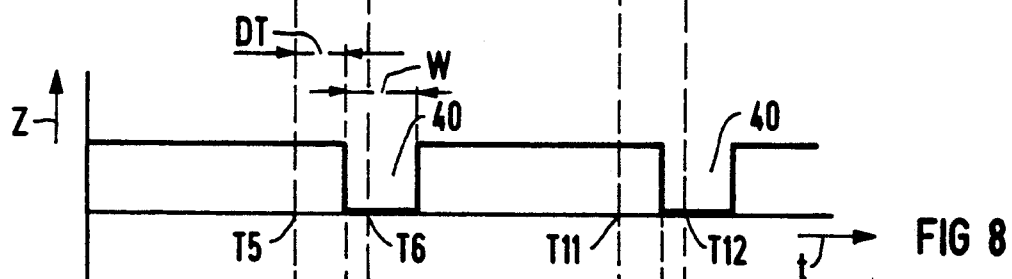
Figure 9:
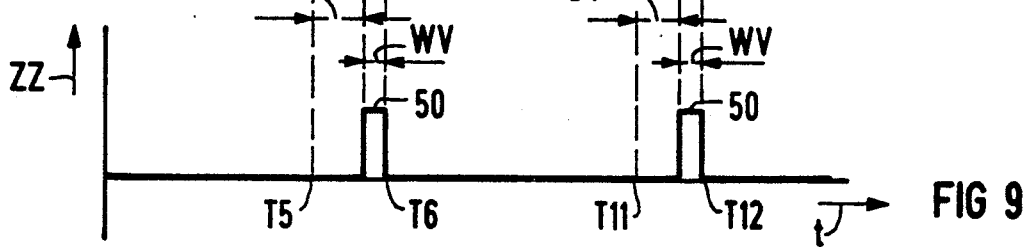

The limitation of the duration of the firing signals ZZ that are passed on to the semiconductor switch can be produced in that, e.g. according to FIG. 5, a primary firing signal Z, whose temporal length is firmly specified and which signal is delayed according to a preselected firing angle, is derived from the reference signal X in the control device 14. This primary firing signal is then made available on a control output 141 of the control device 14, e.g., and together with the reference signal X, is supplied to a logic gate 15, to whose output a secondary firing signal ZZ used for firing is applied.

The timing sequence of the corresponding signals are shown in FIGS. 6 to 9. Corresponding to FIG. 8, primary firing signals Z, which are indicated in the figure by the reference numeral 40, are generated in the control device. These primary firing signals are delayed from the instants T5 and T11 by the time displacement DT and have a firmly specified temporal width W. One may conclude from the figure that the primary firing signals Z are also still present even when the current has already been established. The secondary firing signals ZZ shown in FIG. 9 arise in the exemplified embodiment through a logical ($\bar{Z} \wedge \bar{X}$—, i.e. NOTZ AND NOTX—, interconnection of the primary firing signals Z according to FIG. 8 with the reference signals X according to FIG. 7.

The firmly-specified temporal length W of the primary firing signal Z is thus adequately calculated so that the secondary firing signal ZZ derived from it is adequate for the reliable ignition of the respective phase even under unfavorable operating conditions. Together with the time limitation of the secondary firing signal ZZ, the prevention of an overloading of the ignition amplifier can be achieved despite an adequate reserve in the temporal length of the firing signal.

The method explained in light of FIGS. 6 to 9 can also be used for controlling three-phase a.c. power controllers in which at least two phases must be fired simultaneously in the case of firing angles DT exceeding 60°. For this purpose, in analogy to the previously explained method, time-delayed primary firing signals with the firmly-specified temporal length W are derived for each phase, from which secondary firing signals are derived with the aid of a logic circuit. These secondary firing signals fire two respective phases, simultaneously, according to the rotational direction of the alternating current. By means of a logic operation of the primary firing signals with the reference signals, it is ensured on the one hand, then, that the temporal length of the secondary firing signals is limited to the required degree and that additionally, in the case of small firing angles at which a dual-phase firing is not yet necessary, the firing occurs only in the phase with the current zero.

Figure 10:
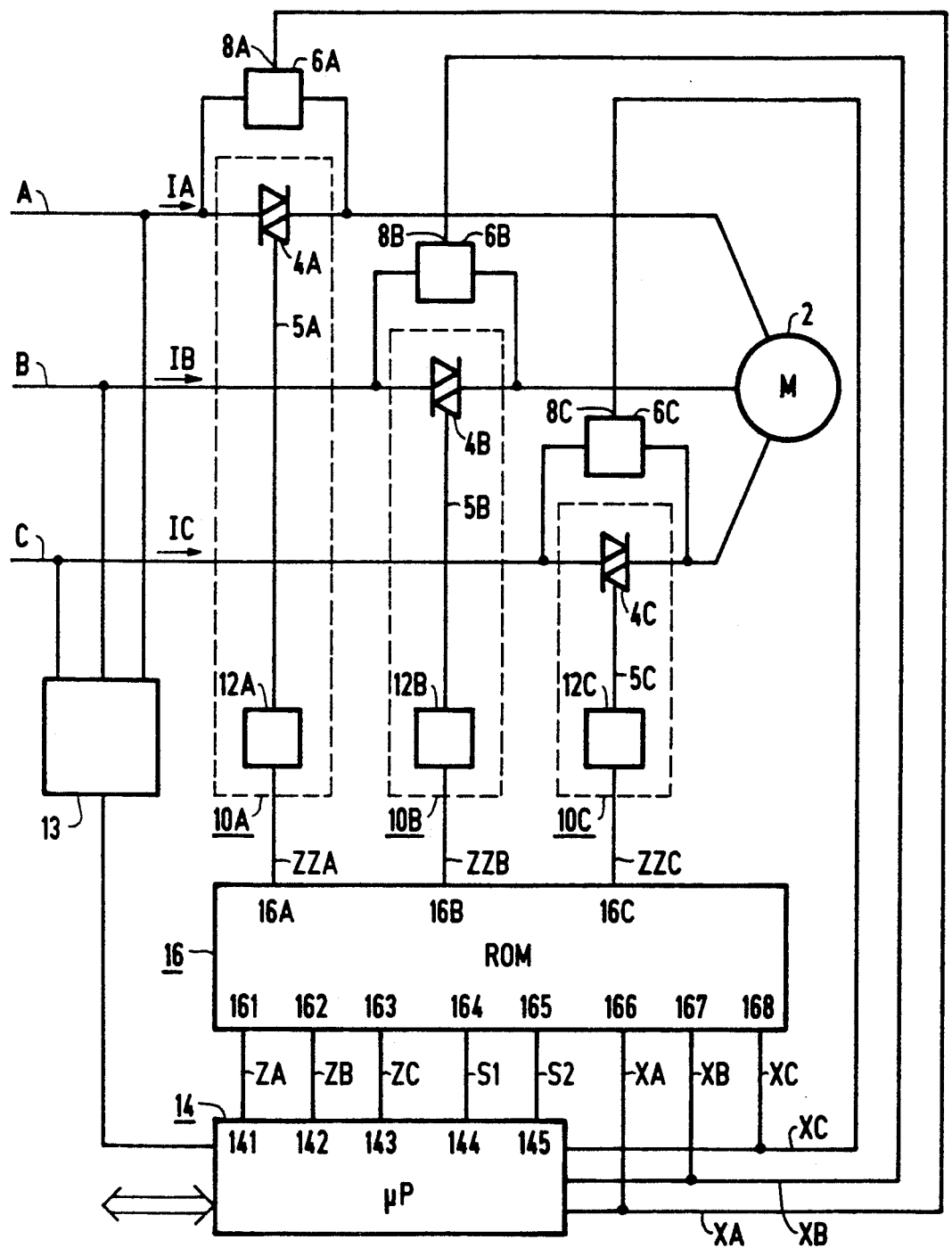
FIG. 10 shows a particularly advantageous device for implementation of the method according to the invention in a three-phase circuit.

According to FIG. 10, in the case of a polyphase a.c. circuit, the motor 2 is connected via a semiconductor switch 4A, 4B, or 4C, respectively, to the three phases of a three-phase power supply.

The semiconductor switches 4A, 4B, and 4C are provided with respective control electrodes 5A, 5B, or 5C and part of respective firing device 10A, 10B or 10C, which include the requisite ignition amplifiers 12A, 12B, or 12C for the semiconductor switches 4A, 4B, and 4C. Secondary firing signals, which produce a firing of the respective semiconductor switch 4A, 4B, or 4C, are applied to the control electrodes 5A, 5B, or 5C as a function of the phase positioning. A reference detector 6A, 6B, or 6C is respectively assigned to the semiconductor switches 4A, 4B, or 4C, with which reference detector 6A, 6B, or 6C the current zero of the current IA, IB or IC flowing in the phases A, B, and C, respectively, is detected by way of the voltage drop across the semiconductor switches 4A, 4B, or 4C. On the outputs 8A, 8B, 8C of the respective reference detectors 6A, 6B, or 6C, reference signals XA, XB, or XC, respectively, are issued, which signals basically reproduce the conduction states of the semiconductor switches 4A, 4B, or 4C, respectively, in analogy to the exemplified embodiment explained with reference to FIG. 1. The edges between both of these circuit states then coincide temporally with the current zeros of the current flowing through the semiconductor switches 4A, 4B, and 4C, respectively. The outputs 8A, 8B, and 8C of the reference dectors 6A, 6B or 6C, respectively, are connected to a control device 14—e.g. a microprocessor—which control device 14 derives time-delayed primary firing signals ZA, ZB, and ZC from the reference signal XA, XB, and XC corresponding to a preselected firing angle, and issues these time-delayed primary signals ZA, ZB and ZC on a control output 141 142 or 143, respectively, which are assigned to a respective phase A, B, or C.

In addition, binary control signals S1 and S2 are made available by the control device 14 on further control outputs 144 and 145, which binary control signals S1, S2 indicate operating modes of the control device according to their levels as well as in the rotational direction of the three-phase current. For the detection of this rotational direction, a rotational direction detector 13 can be provided which passes on to the control device 14 a binary-coded output signal corresponding to the rotational direction according to the example in the figure. The control outputs 141 to 145 are connected to the control inputs 161 to 165 of a read only memory ("ROM") 16, preferably a programmable ROM ("PROM"), in particular, an EPROM or an EEPROM. The ROM 16 is also provided with additional control inputs 166 to 168, which are respectively connected to an output 8A, 8B or 8C, of the reference detectors 6A, 6B or 6C. The primary firing signals ZA, ZB and ZC applied to the control inputs 161 to 165 as well as the control signals S1 and S2, together with the reference signal XA, XB and XC applied to the control inputs 166 to 168, are processed correspondingly in a table programmed in the ROM 16. The secondary firing signals ZZA, ZZB or ZZC, respectively, which were acquired according to this preselected table for the three phases, are applied in the form of a binary data word to the digital outputs 16A, 16B and 16C of the ROM 16. The data outputs 16A, 16B, and 16C are connected respectively to a firing device 10A, 10B or 10C, in which firing device the secondary firing signals ZZA, ZZB and ZZC are amplified and transmitted separately to the controllable semiconductor switches 4A, 4B, or 4C respectively. The primary firing signals ZA, ZB , and ZC are logically linked with the reference signals XA, XB, and XC in the ROM 16 such that only when the reference signals XA, XB, or XC, respectively, indicate at the same instant through their status—e.g. 0 (active low)—that no current ia flowing in the respective phase and various (active high) secondary firing signals ZZA, ZZB, and ZZC are generated. By means of this logic operation of the primary firing signals ZA, ZB, ZC with the reference signals XA, XB, XC, which operation is realized in the ROM 16, the temporary limitation of the secondary firing pulses ZZA, ZZB, ZZC to the duration required for firing is brought about. Through this measure it is also ensured that the dual-phase firing programmed in the ROM 16 will become active only then, when the firing angle exceeds a value of 60°, since only under this condition can the situation arise that all three phases are non-conductive at the same instant.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A method for controlling an a.c. power controller having at least one phase and each phase having a corresponding semiconductor switch coupled between said phase and a load, said method comprising:
specifying a fixed time length for primary firing signals for each semiconductor switch to be controlled;

generating a binary reference signal from a voltage appearing across each of said corresponding semiconductor switches, each of said binary reference signals having first and second logical states and being generated in dependence on a voltage appearing across each of said corresponding semiconductor switches, such that said reference signal is in said first logical state when a current through said semiconductor switch is smaller in absolute value that a pre-defined threshold value, and said reference signal is in said second logical state when a current through said semiconductor switch is larger in absolute value than said pre-defined threshold value;

generating said primary firing signals for each semiconductor switch in dependence on said corresponding binary reference signal and having said specified fixed time length, such that said firing signals for each semiconductor switch are generated a pre-determined amount of time after said corresponding reference signal changes from said second logical state to said first logical state;

generating secondary firing signals for each semiconductor switch in dependence on said corresponding primary firing signals and said corresponding binary reference signals, such that said secondary firing signals for each semiconductor switch are generated while said corresponding primary firing signals are generated while said corresponding binary reference signals remain in said first logical state; and supplying said secondary firing signals to said corresponding semiconductor switches.

2. The method of claim 1, wherein when said a.c. power controller has one phase, said secondary firing signals are only generated when current flowing through said semiconductor switch falls below said pre-defined threshold value.

3. The method of claim 1, wherein when said a.c. power controller has three phases, said secondary firing signals are generated for at least two semiconductor switches of two phases simultaneously only when current flowing through said corresponding semiconductor switches falls below said pre-defined threshold value.

4. An apparatus for controlling an a.c. power controller having at least one phase and each phase having a corresponding semiconductor switch coupled between said phase and a load, said apparatus comprising:

means for specifying a fixed time length for primary firing signals for each semiconductor switch to be controlled;

means for generating a binary references signal for each semiconductor switch from a voltage appearing across each of said corresponding semiconductor switches, each of said binary reference signals having first and second logical states and being generated in dependence on a voltage appearing across each of said corresponding semiconductor switches, such that said reference signal is in said first logical state when a current through said semiconductor switch is smaller in absolute value than a pre-defined threshold value, and said reference signal is in said second logical state when a current through said semiconductor switch is larger in absolute value than said pre-defined threshold value;

means for generating said primary firing signals for each semiconductor switch in dependence on said corresponding binary reference signal and having said specified fixed time length, such that said primary firing signals are generated a pre-determined amount of time after said corresponding reference signals change from said second logical state to said first logical state; and means for generating secondary firing signals for each semiconductor switch in dependence on said corresponding primary firing signals and said corresponding binary reference signals, such that said secondary firing signals for each semiconductor switch are generated while said corresponding primary firing signals are generated while said corresponding binary reference signals remain in said first logical state.

5. The apparatus of claim 4, wherein said binary reference signal generating means comprises a reference detector having a comparator, whereby the voltage appearing across said corresponding semiconductor switches is compared to said pre-defined threshold value.

6. The apparatus of claim 5, wherein a control device comprises said specifying means and said primary signal generating means, and said secondary signal generating means comprises a logic gate having first and second inputs and an output, said control device capable of supplying said primary firing signals to said first input of said logic device and said comparator capable of supplying said binary reference signals to said second input of said logic device, said logic device combining said primary firing signals and providing said secondary firing signals to the output of said logic device.

7. The apparatus of claim 6, wherein said a.c. power controller has three phases, such that said secondary firing signals are generated for two of said three phases simultaneously when current through corresponding semiconductor switches falls below said pre-defined threshold value, said control device generating said delayed primary firing signals in dependence on a preselected firing angle, said firing angle being preselected at said control device, said apparatus further comprising:

a read only memory having a plurality of control inputs coupled to said control device and said reference detectors, said read only memory storing said secondary firing signals and supplying said secondary firing signals to said corresponding semiconductor switches in dependence on said control device and said binary reference signals.

* * * * *